No. 876,747. PATENTED JAN. 14, 1908.
G. W. & E. THURMOND.
LEVEL INDICATOR FOR PLOWS.
APPLICATION FILED MAY 16, 1907.
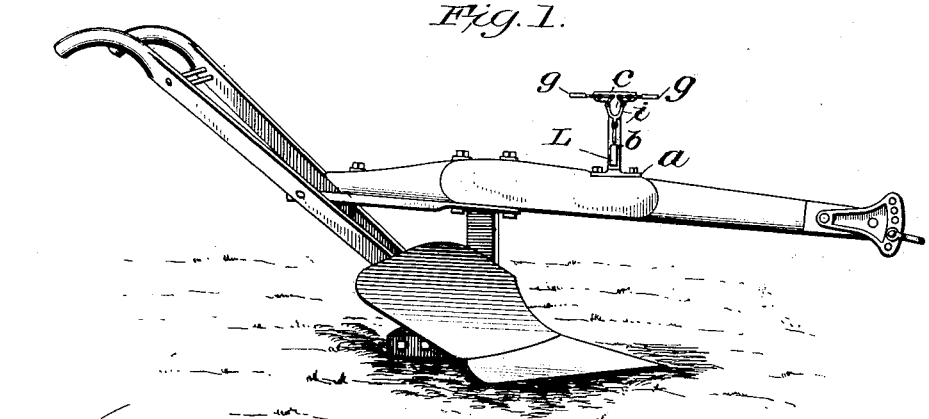
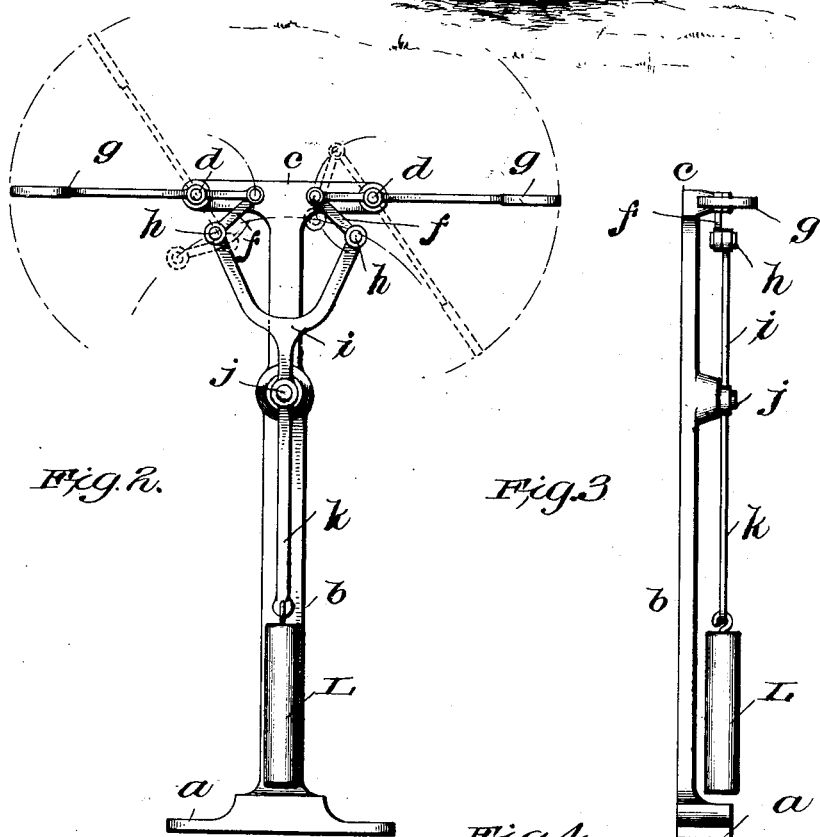
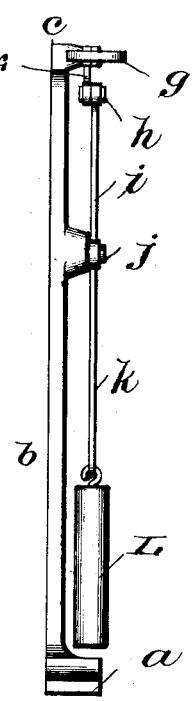
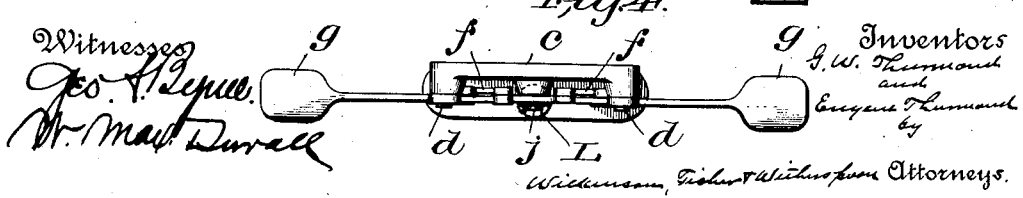

# UNITED STATES PATENT OFFICE.

GEORGE W. THURMOND AND EUGENE THURMOND, OF WOODLAWN, SOUTH CAROLINA.

LEVEL-INDICATOR FOR PLOWS.

No. 876,747.

Specification of Letters Patent.

Patented Jan. 14, 1908.

Application filed May 16, 1907. Serial No. 374,000.

*To all whom it may concern:*

Be it known that we, GEORGE W. THURMOND and EUGENE THURMOND, citizens of the United States, both residing at Woodlawn, county of Edgefield, State of South Carolina, have invented certain new and useful Improvements in Level-Indicators for Plows; and we do hereby declare the following to be a full, clear, and exact description of the invention, such as will enable others skilled in the art to which it appertains to make and use the same.

It is well known in plowing around hill sides that it is very difficult to keep the rows plowed on a level, and that if such rows are not kept on a substantial level, washing and other damage results which seriously impairs the fertility of the soil, and if not corrected will soon destroy the land. Heretofore, in order to indicate to the plowman the direction his furrows should be made, it has been customary to lay out with more or less precision points on the land to guide him by means of a hand level or other surveying instrument, or to partially or wholly terrace the hill sides. Both of these methods are cumbersome and expensive, and the object of my invention is to accomplish the same desirable results, that is to say, to accomplish the plowing of rows on a substantial level without any previous preparation at all.

To these ends, my invention consists in a level indicator for plows which will show to the plowman at all times, while the plow is in motion, whether he is plowing up hill or down hill, and therefore it will enable him to know in just what direction his plow is moving, and thereby will also show to him that he should turn his plow further up hill or further down hill, in order to keep the furrow on a substantial level.

Referring to the accompanying drawings forming a part of this application—Figure 1 represents a side elevation of a plow with my level indicator attached. Fig. 2 is a front elevation of the level indicator itself. Fig. 3 is a side elevation of the same, and Fig. 4 is a plan view.

Like letters of reference indicate like parts in all the views.

*a* indicates the base of the standard supporting my level indicator which is secured to the plow beam in any convenient manner.

*b* indicates an upright rising from the base *a*, and *c* a T-head attached to or made integral with said upright. Said head *c* is provided with two pivots *d* to which are pivoted the indicating arms *g* connected by links *f* by means of the pivots *h* to the Y-shaped link *i*, pivoted at *j* to the upright *b*, as shown. To the lower end of the Y-shaped link *j* is pivotally attached a weight L.

In operation, should the plow move up hill, the tendency of the weight L to remain in a vertical plane will cause the farther of the indicating arms *g* to rise, and should the plow move down hill, the same weight L will cause the nearer indicating arm *g* to move up and the further arm *g* to move down, as shown in Fig. 2. In both cases, the plowman will notice at once his error, and by suitably directing the plow to one side or the other he will cause the furrow to follow a substantially level plane, and thereby avoid many of the disadvantages due to washing and other destructions of the soil, which, as is well known, will follow the making of furrows on hill sides that are not substantially level.

Our device, as shown, we prefer to make of metal, but, of course, it may be made of any suitable material, and of any suitable height or dimensions. In practice, a device of about the relative dimensions shown will answer every purpose, although one of a greater or less height will be found useful in many cases. The parts of necessity are made sufficiently heavy to withstand the weather and the rough usage to which they must be subjected, and this, also, compels them to be insensitive to the comparative slight and sudden changes of level due to any inequalities in the depth of the furrow. The inequalities of level due to the plow going uphill or downhill, however, are of greater magnitude and are much less sudden in character. And my indicator, although too sluggish to be operated by the variations in the depth of the furrow, is, yet, sensitive enough to operate when the plow goes up or down hill.

Having now described our invention, what we claim as new and desire to secure by Letters Patent, is:—

1. A plow provided with means for indicating to the plowman while plowing around a hillside the fact that he is deviating from a substantially level course, substantially as described.

2. A plow provided with means comprising a level for indicating to the plowman, while the plow is in motion, whether or not it is following a substantially level course around a hillside, substantially as described.

3. A plow provided with means consisting of a level provided with a pivoted weight for indicating to the plowman, while plowing around a hillside, whether he is going up hill or down hill, substantially as described.

4. A plow provided with means consisting of a level, comprising a weight, indicators and pivotal connections between said weight and indicators, whereby the plowman is notified if he deviates, while plowing, from a substantially level course, substantially as described.

5. The combination of a plow and the level indicator, consisting of the base, the pivoted indicators mounted on said base, the Y-shaped link, links connecting the same and said indicators, and a weight pivoted to said Y-shaped link, substantially as described.

6. In a level indicator for plows, the combination of a support adapted to be attached to a plow, indicators attached to said support, a pivoted link carried by said support, connections between said indicators and said link, and a weight for moving the indicators, substantially as described.

7. In a level indicator for plows, the combination of a support adapted to be attached to a plow, pivoted indicators carried by said support, a Y-shaped link pivoted to said support, links connecting said indicators and said Y-shaped link, and a weight attached to the latter, substantially as described.

8. An instrument provided with means comprising a level for indicating to the plowman while plowing around a hillside the fact that he is departing from a substantially level course, and thereby enabling him to prevent undue washing of the soil by causing all his furrows to be substantially level, substantially as described.

In testimony whereof, we affix our signatures, in presence of two witnesses.

G. W. THURMOND.
EUGENE THURMOND.

Witnesses:
GEO. WRIGHT,
T. WRIGHT